UNITED STATES PATENT OFFICE.

CARLETON ELLIS, OF MONTCLAIR, NEW JERSEY.

COMPOSITE HYDROGENATED FAT COMPOUND, &c.

1,070,331.   Specification of Letters Patent.   Patented Aug. 12, 1913.

No Drawing.   Application filed December 31, 1912.   Serial No. 739,424.

*To all whom it may concern:*

Be it known that I, CARLETON ELLIS, a citizen of the United States, and a resident of Montclair, in the county of Essex and State of New Jersey, have invented certain new and useful Improvements in Composite Hydrogenated Fat Compounds, &c., of which the following is a specification.

This invention relates to edible products and relates particularly to a composition comprising hydrogenated oily or fatty material and to the process of making same; all with especial reference to the production of a stable fatty composition of substantially the consistency of lard, through the admixture of divers oily and fatty materials to form a composite fatty product.

Hydrogenated oil of high titre may be mixed with unhydrogenated oil to form a body of a consistency suitable for use as a substitute for lard. For example hydrogenated cotton oil of a titre of say 52° C. (fatty acids) may be melted and incorporated with four times its weight or so of ordinary refined or deodorized cotton seed oil so as to form on cooling a white or whitish, opaque fatty material of somewhat the consistency of ordinary lard. The product made in this manner in some respects is not sufficiently stable. Often it is likely in a short time to lose its opacity to a considerable degree and to take on an appearance more nearly resembling petrolatum than lard. Sometimes this change, which may be due to a tendency to form solid solutions of certain types, occurs irregularly in layers or isolated zones which give the product a curious mottled appearance and this striated effect taking place in the containers during storage so changes the product physically at least that it is regarded as damaged or unfit for use by those accustomed to the normal appearance of lard.

The present invention seeks to overcome this, from the commercial standpoint, highly condemnatory property and to produce a product which is stable under normal meteorological conditions for an indefinite time and which even is very resistant under extreme service conditions. This I accomplish by disseminating through a fatty basis, of a melting point and consistency say about that of lard, a quantity of fatty material of higher titre so as to form, for example, flocculations of a high titre product uniformly or well disseminated through the fatty basis. The material of the high or relatively higher titre may be denominated the stabilizer, and the proportions of said fatty basis and said stabilizer as well as their melting points and titres may be varied to meet various conditions of a climatic nature or otherwise.

While the product may be prepared from various oils particularly vegetable oils I prefer particularly a fatty basis derived from cotton seed oil and its hydrogenated derivative. As a stabilizer I prefer either corn or cotton oil containing hydrogenated or hardened oil of a suitable titre. An example will make clear what I mean by a fatty basis and a stabilizer, as used herein.

As an illustrative embodiment, I may take to make the fatty basis, 6 parts of hydrogenated cotton seed oil of a titre ranging between 52–54° C. (fatty acids) and 34 parts of refined and deodorized cotton seed oil. A thorough mixture is secured by the aid of heat and when well incorporated the melted product is chilled rapidly, preferably in a thin layer, as may be secured by feeding the liquid mixture while hot onto a chilled roll which is kept in constant rotation and from which the congealed or solidified product is removed in layers or shavings by a scraper or doctor. This product when properly set has a consistency similar to or approaching that of ordinary lard. The stabilizer is prepared by incorporating 3 parts of hydrogenated cotton seed oil of the same titre as that used in making the fatty basis, with 5 parts of refined and deodorized cotton seed oil. By heating the hardened oil with the deodorized oil the requisite mixture is readily obtained. As in making the fatty basis, the stabilizer is likewise chilled to form a solid, preferably in thin layers, and the two products are mixed in powerful mixing apparatus until the stabilizer is well disseminated through the fatty basis. Preferably during the last mentioned step of mixing, some air is incorporated in the product to whiten same.

In order to secure a desirable distribution of the stabilizer, I may feed both the fatty basis and the stabilizer onto the same chill roll in a series of adjacent or alternate streams, or preferably allow the fatty basis to fall on the chill roll and when it has progressed a distance sufficient to solidify but not to stiffen fully the stabilizer is applied as a superposed coating adherent to and slightly intermingled at the contacting surfaces, with the fatty basis. This composite or dual film is removed by the scraper and is then "pugged" or beaten to such an extent as may be desired. As the melting point of the stabilizer is preferably considerably higher than that of the fatty basis, the former congeals more quickly, so that although the superposed film is somewhat insulated from the chill roll by the fatty basis film yet the solidification of the upper layer is usually rapid enough to prevent material solution or interfusion of the two heterogeneous layers. Such interfusion if extensive is undesirable as then the product becomes more nearly homogeneous physically instead of retaining a substantial condition of heterogeneity.

The process is susceptible to considerable modification yielding corresponding changes in the product and I do not wish to limit myself to the precise procedure or procedures set forth herein, nor to the exact formulas indicated; but may invoke the doctrine of equivalency in so far as same may be herein applicable. Thus an oil basis comprising a major portion of deodorized cotton seed oil and hydrogenated corn or soya bean oil may be admixed with hydrogenated oil of higher titre so that the latter is substantially undissolved in said basis. The hydrogenated oil of higher titre may be a simple hydrogenated oil as that from cotton seed, corn, soya bean, peanut, sesame, cocoanut oil and the like or animal and fish or whale oils. Considerable variation likewise is possible in the case of the melting points of the fatty basis and the stabilizer, according to the nature of the oily or fatty raw materials and to other circumstances. In general the melting point of the stabilizer should be several degrees above the highest climatic temperature to which the finished product is likely to be subjected, an adjustment which, in the light of the present disclosure, will now be clear to those skilled in the art.

In place of hydrogenated oil any hard or hardened oil or fat of suitable melting point may be employed under the present invention to produce the condition of heterogeneity conducive to color stability or opacity.

In a similar manner by duly lowering the melting points of the component parts a product which melts readily at the temperature of the mouth, may be obtained, which is useful as a butter substitute. Here the property of opacity is not so important; but the procedures employed herein are nevertheless of utility in this connection. The fatty product may be mingled with some water and a small quantity of salt or in place of water, milk material may be incorporated. Coloring matter may be added, or oils of a yellow or reddish color such as a certain grade of cotton seed oil which is of a red color and used in moderate quantities imparts a yellowish tint to the composition, without addition of any artificial coloring matter. Similarly palm oil or its hydrogenated derivative may be employed.

This application is in part a continuation of my co-pending application Serial No. 711,745 filed July 26, 1912, at least as regards mixing an over hydrogenated with an under hydrogenated oil.

Further modifications of my procedure may be expressed in the following: Eighty parts of cotton seed oil are mixed with fifteen parts of hydrogenated oil of a titre of 48 (fatty acids). This is chilled and mixed with five parts of melted 42° C. titre hydrogenated or hard oil, or fat. Likewise one can superpose on a basis of 34-38 titre about 20% of 40-42 titre. Cotton seed oil may be hydrogenated to 37 titre, chilled as described or otherwise, and similarly incorporated with about 10-20% cotton seed oil hydrogenated to 40-42 titre. Thus there may be obtained a lardlike or otherwise consistent fatty material having its main titre to a considerable degree uninfluenced so that the product may have the desired soft consistency of ordinary lard while actually containing bodies which if melted into the fatty basis would raise the melting point and consistency to perhaps an undesirable degree.

To recapitulate, my invention relates to the preparation of a fatty compound preferably of substantially the consistency of ordinary lard, which compound preferably possesses the desirable property of essential or substantial color stability under normal meteorological conditions, so that the opacity or translucency of the compound do not, when the latter is properly prepared, suffer any undesirable change to the detriment of the appearance and marketability of said compound, even after storage for a considerable or indefinite period; and to the product of such characteristics, all as herein illustratively set forth.

What I claim is:—

1. An edible oil product consisting of a substantially stable composition of an edible nature comprising a major portion of deodorized cotton seed oil and a minor portion of a mixture of hydrogenated oils of high and low titre.

2. An edible oil composition consisting of a substantially stable oil basis comprising a major portion of deodorized cotton seed oil and hydrogenated oil, and hydrogenated oil of higher titre admixed with but substantially undissolved in said oil basis.

3. An edible oil product comprising a major portion of deodorized cotton seed oil and a minor portion of hydrogenated oil, a portion thereof being disseminated through said product as flocculations of high titre, said product being stable as regards color and consistency under normal meteorological conditions.

4. An edible oil product comprising a major portion of deodorized edible oil and a minor portion of edible hydrogenated fatty material, a portion thereof being disseminated through said oil as flocculations of high titre, said product being substantially stable as regards color and consistency under normal meteorological conditions.

5. An edible oil product of fatty consistency comprising an edible oil, a hydrogenated oil assimilated by said oil and a hydrogenated oil unassimilated by said oil.

6. An edible oil product of substantially the consistency of lard comprising edible vegetable oil and hydrogenated oil containing flocculated nuclei of relatively high melting point.

7. An edible oil product of substantially the consistency of lard comprising edible oil and edible hydrogenated oil containing flocculated nuclei of relatively high melting point.

8. An edible oil product of substantially the consistency of lard comprising edible vegetable oil and hydrogenated vegetable oil containing flocculated nuclei of relatively high melting point.

9. An edible oil product of substantially the consistency of lard comprising deodorized cotton seed oil and edible hydrogenated cotton seed oil containing flocculated nuclei of relatively high melting point.

10. An edible fat compound comprising hydrogenated and unhydrogenated oil of an edible nature, said compound being color-stable.

11. An edible fat compound comprising hydrogenated and unhydrogenated cotton seed oil of an edible nature, said compound being color-stable.

12. An edible fat compound of substantially the consistency of ordinary lard comprising hydrogenated and unhydrogenated cotton seed oil of an edible nature, said compound being color-stable.

13. An edible fat compound of substantially the consistency of ordinary lard comprising edible hydrogenated and unhydrogenated cotton seed oil.

14. The process of making an edible fat compound which comprises mixing at least two fatty products of different titre without interfusion.

15. A stable lard compound substitute comprising hydrogenated cotton seed oil of a consistency softer than indicated by the titre of said compound.

16. The process of making an edible fat compound which comprises mingling without substantial interfusion an oil basis comprising hydrogenated oil, such oil basis having a relatively soft consistency, with hydrogenated oil material of harder consistency.

Signed at Montclair in the county of Essex and State of New Jersey this 28th day of December A. D. 1912.

CARLETON ELLIS.

Witnesses:
B. M. ELLIS,
A. A. WELLS.